(12) United States Patent
Arikawa et al.

(10) Patent No.: US 10,361,779 B2
(45) Date of Patent: Jul. 23, 2019

(54) OPTICAL TRANSMISSION SYSTEM, OPTICAL RECEIVER, AND METHOD FOR DETECTING OPTICAL SIGNAL INFORMATION

(71) Applicant: NEC Corporation, Minato-ku, Tokyo (JP)

(72) Inventors: Manabu Arikawa, Tokyo (JP); Emmanuel Le Taillandier De Gabory, Tokyo (JP); Toshiharu Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/559,150

(22) PCT Filed: Mar. 17, 2016

(86) PCT No.: PCT/JP2016/001543
§ 371 (c)(1),
(2) Date: Sep. 18, 2017

(87) PCT Pub. No.: WO2016/152110
PCT Pub. Date: Sep. 29, 2016

(65) Prior Publication Data
US 2018/0069625 A1 Mar. 8, 2018

(30) Foreign Application Priority Data

Mar. 25, 2015 (JP) ................................. 2015-062670

(51) Int. Cl.
*H04B 10/079* (2013.01)
*H04B 10/077* (2013.01)
(Continued)

(52) U.S. Cl.
CPC ..... *H04B 10/07951* (2013.01); *H04B 10/077* (2013.01); *H04B 10/25* (2013.01); *H04B 10/2513* (2013.01); *H04B 10/2581* (2013.01)

(58) Field of Classification Search
None
See application file for complete search history.

(56) References Cited

U.S. PATENT DOCUMENTS

2012/0099864 A1* 4/2012 Ishihara ................... H04B 3/06
398/65

FOREIGN PATENT DOCUMENTS

JP 5159953 B2 3/2013
JP 2013-229783 A 11/2013
(Continued)

OTHER PUBLICATIONS

E. de Gabory et al., "A Shared Carrier Reception and Processing Scheme for Compensating Frequency Offset and Phase Noise of Space-Division Multiplexed Signals over Multicore Fibers", OFC2013, OM2C.2, 2013 (3 pages total).
(Continued)

*Primary Examiner* — Kenneth N Vanderpuye
*Assistant Examiner* — David W Lambert

(57) ABSTRACT

In the optical transmission system to transmit optical signals using a plurality of adjacent paths, it is difficult to detect a delay difference between a plurality of paths and chromatic dispersion with a high degree of accuracy due to a crosstalk; therefore, a method for detecting optical signal information according to an exemplary aspect of the present invention includes generating a plurality of data signal sequences corresponding to a plurality of paths multiplexed spatially, each of the plurality of data signal sequences obtained by inserting periodically a training signal with a plurality of frequency components in a data signal, in the plurality of data signal sequences, the training signals respectively included in the data signal sequences to be propagated through adjacent paths at least having different frequency components from each other at the same timing, each of a plurality of the training signals included in one of the data
(Continued)

signal sequences having the plurality of frequency components whose frequency difference differing depending on a position to be inserted; and calculating a propagation delay difference between the plurality of paths and chromatic dispersion amounts in the plurality of paths from the plurality of frequency components included in the training signals having been propagated through the plurality of paths by optical signals.

11 Claims, 14 Drawing Sheets

(51) Int. Cl.
    *H04B 10/2513*      (2013.01)
    *H04B 10/25*      (2013.01)
    *H04B 10/2581*      (2013.01)

(56) References Cited

FOREIGN PATENT DOCUMENTS

| JP | 2014-138316 A | 7/2014 |
| WO | 2011/007803 A1 | 1/2011 |
| WO | 2014/112516 A1 | 7/2014 |

OTHER PUBLICATIONS

Liu, Xiang et al., "Performance Improvement of Space-Division Multiplexed 128-Gb/s PDM-QPSK Signals by Constructive Superposition in a Single-Input-Multiple-Output Configuration", OFC/NFOEC 2012, 2012 (3 pages total).

International Search Report dated May 24, 2016 issued by the International Searching Authority in International Application No. PCT/JP2016/001543.

* cited by examiner

OPTICAL TRANSMISSION SYSTEM, OPTICAL RECEIVER, AND METHOD FOR DETECTING OPTICAL SIGNAL INFORMATION

This application is a National Stage Entry of PCT/JP2016/001543 filed on Mar. 17, 2016, which claims priority from Japanese Patent Application 2015-062670 filed on Mar. 25, 2015, the contents of all of which are incorporated herein by reference, in their entirety.

TECHNICAL FIELD

The present invention relates to optical transmission systems, optical receivers, and methods for detecting optical signal information and, in particular, to an optical transmission system that transmits optical signals using a plurality of paths, an optical receiver, and a method for detecting optical signal information.

BACKGROUND ART

Communication data traffic has been increasing in recent years. In order to hold such communication data traffic efficiently, high-capacity transmission is required also for long-haul optical transmission. It has recently been reported that there are limitations to transmission capacity per single mode fiber because the optical intensity that can be inputted into one core of a single mode fiber is limited due to non-linear effect in the fiber and the like. Accordingly, spatial multiplexing transmission technologies in which signals are multiplexed by using spatial degrees of freedom are being studied for further high-capacity transmission.

A multicore fiber having a plurality of cores in a clad of one fiber is proposed and developed as a transmission path to achieve the spatial multiplexing transmission, for example. In the spatial multiplexing transmission using a multicore fiber having N cores, it is possible to achieve a transmission capacity N times as large as a conventional single mode fiber having one core by transmitting different optical signals between cores.

It is also being studied to improve transmission characteristics by using the plurality of paths that are very close to each other. Non Patent Literature 1 discloses a method for improving signal characteristics due to the diversity effect by transmitting the same signals through a plurality of paths or the same signals subjected to different types of known scrambling for each path and combining received signals. According to the method disclosed in Non Patent Literature 1, the transmission capacity cannot be improved compared to a method using a single mode fiber having one core, but, by transmitting the same signals using N cores, transmission distances become approximately N times longer; consequently, long-haul transmission becomes possible.

The method described in Non Patent Literature is based on the following principle. That is to say, when the same signals divided into N pieces are combined in timing and in phase, their intensities become $N^2$ times larger; in contrast, even when N pieces of uncorrelated noises are combined, their intensities become only N times larger; accordingly, an improvement effect of a signal-to-noise ratio can be obtained. The method is based on the above-described principle. However, if a timing gap even in the order of symbol time occurs among signals in combining the signals, no signal intensity increases, and it may rather cause the degradation. Consequently, in the transmission system in which the signals transmitted and received through the plurality of paths are made to cooperate, it becomes important to estimate delay difference between the signals and compensate for it.

For the long-haul spatial multiplexing transmission using a multicore fiber having N cores, a propagation delay difference between the cores is caused by manufacturing variations of each core, the difference in path length within an optical amplifier, a fan-out component, and each transceiver. The fan-out is an optical component that has the function of coupling optical signals to be inputted and output to a multicore fiber with a single mode fiber-based transceiver. The propagation delay difference is thought to be very small as compared to that in using N single mode fibers, but it is larger than a symbol time. As mentioned above, a timing gap arises when the timings of signals propagated through a plurality of paths are shifted at a receiving side due to a slight difference in path length and the like, and the amount of the timing gap is referred to as a delay difference between a plurality of signals in the following description.

The methods for estimating and compensating for the delay difference between a plurality of signals include a method of framing the signals and adding a specific overhead signal, as an example. In this method, a timing gap is obtained by detecting specific patterns from a plurality of received signals and comparing them. Then it is possible to align the plurality of signals based on the information. However, because timing alignment is performed in this method after completion of decoding each of the plurality of signals, it is necessary to perform the decoding process itself without using the information on the timing gap.

Consequently, it is difficult to apply this method to the method disclosed in Non Patent Literature NPL 1 in which a plurality of signals are combined and made to cooperate before the decoding. There is another method of repeating a process for decoding signals subjected to timing adjustment with a certain adjusted value, changing the adjusted value, until high-quality decoded signals are obtained. However, this method requires a large number of repeat counts if there is no information on an optimum value.

In contrast, as a method for estimating delay difference between a plurality of wavelengths without decoding each signal, there is a chromatic dispersion estimation technology. In the chromatic dispersion estimation technology, a chromatic dispersion is detected by detecting propagation delay difference between a plurality of optical signals that propagate through a fiber and slightly differ in wavelength from each other. An example of such a chromatic dispersion estimation technology is described in Patent Literature 1.

In the related chromatic dispersion value calculation method described in Patent Literature 1, as schematically illustrated in FIG. 12, a training signal in which the intensity is concentrated in two specific frequency components is periodically inserted into a signal to be transmitted. The training signal in which the intensity is concentrated in the two specific frequency components is referred to as a frequency signal. In the example illustrated in FIG. 12, a frequency signal with L symbols in length is inserted following a data signal with R symbols. The frequency signal has only frequency components of $\pm f_0$.

FIG. 13 illustrates a configuration of a chromatic dispersion calculating unit 100 included in a related optical signal receiving apparatus described in Patent Literature 1. All processes in the chromatic dispersion calculating unit are performed by digital signal processing. Received signals are branched into two signals; one of the signals passes through a band-pass filter (BPF) 111 with a passing frequency of $+f_0$, and its intensity is calculated by an intensity calculating circuit 121. The other signal passes through a band-pass filter 112 with a passing frequency of $-f_0$, and its intensity is calculated by an intensity calculating circuit 122. A delay time calculating circuit 130 compares timings at peaks of the intensities for the calculated two frequency components, for example, and calculates a propagation delay difference between the two frequency components. The propagation delay difference is determined by a frequency difference between the two frequency components and a chromatic dispersion amount accumulated in a transmission path.

Accordingly, a chromatic dispersion amount calculating circuit 140 calculates a chromatic dispersion amount from the calculated propagation delay difference and an already-known frequency difference.

As the related technologies, there are technologies described in Patent Literature 2 and Patent Literature 3

CITATION LIST

Patent Literature

[PTL 1] Japanese Patent No. 5159953
[PTL 2] WO 2014/112516
[PTL 3] Japanese Unexamined Patent Application Publication No. 2013-229783

Non Patent Literature

[NPL 1] E. de Gabory et al., "A Shared Carrier Reception and Processing Scheme for Compensating Frequency Offset and Phase Noise of Space-Division Multiplexed Signals over Multicore Fibers", OFC2013, OM2C.2.

SUMMARY OF INVENTION

Technical Problem

If the above-mentioned related chromatic dispersion value calculation method is applied to a plurality of paths to obtain delay differences between the paths, there are the following issues.

In the first issue, there is a problem due to a crosstalk between the plurality of paths. Although high space utilization efficiency is required in spatial multiplexing transmission, a crosstalk between signals transmitted through the plurality of paths cannot be avoided generally in a transmission path with high space utilization efficiency. The crosstalk arising in the transmission path makes a frequency signal also mixed that is inserted into each of signals propagating through the plurality of paths in order to obtain a delay difference. Consequently, if frequency components are inserted into a plurality of signals, the crosstalk causes the accuracy of estimating the delay difference to decrease significantly.

In the second issue, there is a problem that the chromatic dispersion itself in the transmission path has an effect on detection of the delay difference between the plurality of paths. For this reason, the influence of the chromatic dispersion has the potential to become larger than the influence of the difference between the paths. Specifically, a chromatic dispersion value of a single mode fiber normally employed is approximately 17 ps/nm/km. Consequently, a time lag, due to the chromatic dispersion that has been accumulated while a signal having 50 GHz bandwidth at a wavelength of 1,550 nm is transmitted over 1,000 km through a single mode fiber, becomes a large value of approximately 6.8 ns. In addition, the accumulated chromatic dispersion amount can differ between a plurality of paths, in which case the time lag becomes approximately 400 ps under the above-mentioned conditions even though the difference in the chromatic dispersion amount is a mere 1 ps/nm/km.

If the delay difference between the paths can be detected independently of estimating the chromatic dispersion with a high degree of accuracy, it is possible to correct the influence of the chromatic dispersion by the estimation result. If the crosstalk arises between the plurality of paths, however, it is difficult to detect the delay difference between the plurality of paths accurately because the influence of the chromatic dispersion is intermingled with the influence of the delay difference between the plurality of paths. If the chromatic dispersion amount cannot be estimated with a high degree of accuracy, it is also difficult to determine an optimum chromatic dispersion compensation amount.

As described above, there is the problem that, in the optical transmission system to transmit optical signals using a plurality of adjacent paths, it is difficult to detect a delay difference between a plurality of paths and chromatic dispersion with a high degree of accuracy due to a crosstalk.

The object of the present invention is to provide an optical transmission system, an optical receiver, and a method for detecting optical signal information that solve the above-mentioned problem that, in the optical transmission system to transmit optical signals using a plurality of adjacent paths, it is difficult to detect a delay difference between a plurality of paths and chromatic dispersion with a high degree of accuracy due to a crosstalk.

Solution to Problem

A method for detecting optical signal information according to an exemplary aspect of the present invention includes generating a plurality of data signal sequences corresponding to a plurality of paths multiplexed spatially, each of the plurality of data signal sequences obtained by inserting periodically a training signal with a plurality of frequency components in a data signal, in the plurality of data signal sequences, the training signals respectively included in the data signal sequences to be propagated through adjacent paths at least having different frequency components from each other at the same timing, each of a plurality of the training signals included in one of the data signal sequences having the plurality of frequency components whose frequency difference differing depending on a position to be inserted; and calculating a propagation delay difference between the plurality of paths and chromatic dispersion amounts in the plurality of paths from the plurality of frequency components included in the training signals having been propagated through the plurality of paths by optical signals.

An optical transmission system according to an exemplary aspect of the present invention includes a spatial multiplexing transmission path including a plurality of paths multiplexed spatially; an optical transmitter configured to send an optical signal to each of the plurality of paths; and an optical receiver configured to receive the optical signal having been propagated through each of the plurality of paths, wherein the optical transmitter includes a data signal sequence generation means for generating a plurality of data signal sequences corresponding to the plurality of paths, each of the plurality of data signal sequences obtained by inserting periodically a training signal with a plurality of frequency components in a data signal, and an optical modulation means for generating a plurality of the optical signals by modulating optical carriers respectively with the plurality of data signal sequences, wherein, in the plurality of data signal sequences, the training signals respectively included in the data signal sequences to be propagated through adjacent paths at least include different frequency components from each other at a same timing, and each of the plurality of training signals included in one of the data signal sequences includes the plurality of frequency components whose frequency difference differs depending on a position to be inserted, wherein the optical receiver includes an optical detection means for receiving and detecting the plurality of optical signals having been propagated through the plurality of paths respectively, and outputting the plurality of data signal sequences, and an optical signal information detection means for calculating a propagation delay difference between the plurality of paths and chromatic dispersion amounts in the plurality of paths from the plurality of frequency components included in the training signals constituting the data signal sequences output from the optical detection means.

An optical receiver according to an exemplary aspect of the present invention includes an optical detection means for receiving and detecting a plurality of optical signals having been respectively propagated through a plurality of paths multiplexed spatially, and outputting a plurality of data signal sequences; and an optical signal information detection means for calculating a propagation delay difference between the plurality of paths and chromatic dispersion amounts in the plurality of paths, wherein the data signal sequence is obtained by inserting periodically a training signal with a plurality of frequency components in a data signal, wherein, in a plurality of the data signal sequences corresponding to the plurality of paths, the training signals respectively included in the data signal sequences to be propagated through adjacent paths at least include different frequency components from each other at a same timing, and each of the plurality of training signals included in one of the data signal sequences includes the plurality of frequency components whose frequency difference differs depending on a position to be inserted, wherein the optical signal information detection means calculates the propagation delay difference and the chromatic dispersion amounts from the plurality of frequency components included in the training signals constituting the data signal sequences output from the optical detection means.

Advantageous Effects of Invention

According to the optical transmission system, the optical receiver, and the method for detecting optical signal information of the present invention, it is possible, in the optical transmission system to transmit optical signals using a plurality of adjacent paths, to detect a delay difference between a plurality of paths and chromatic dispersion with a high degree of accuracy even though a crosstalk arises.

EXAMPLE EMBODIMENT

Example embodiments of the present invention will be described below with reference to the drawings. The arrow direction in the figures shows an example, and does not limit the direction of signals between blocks.

First Example Embodiment

Figure 1A:
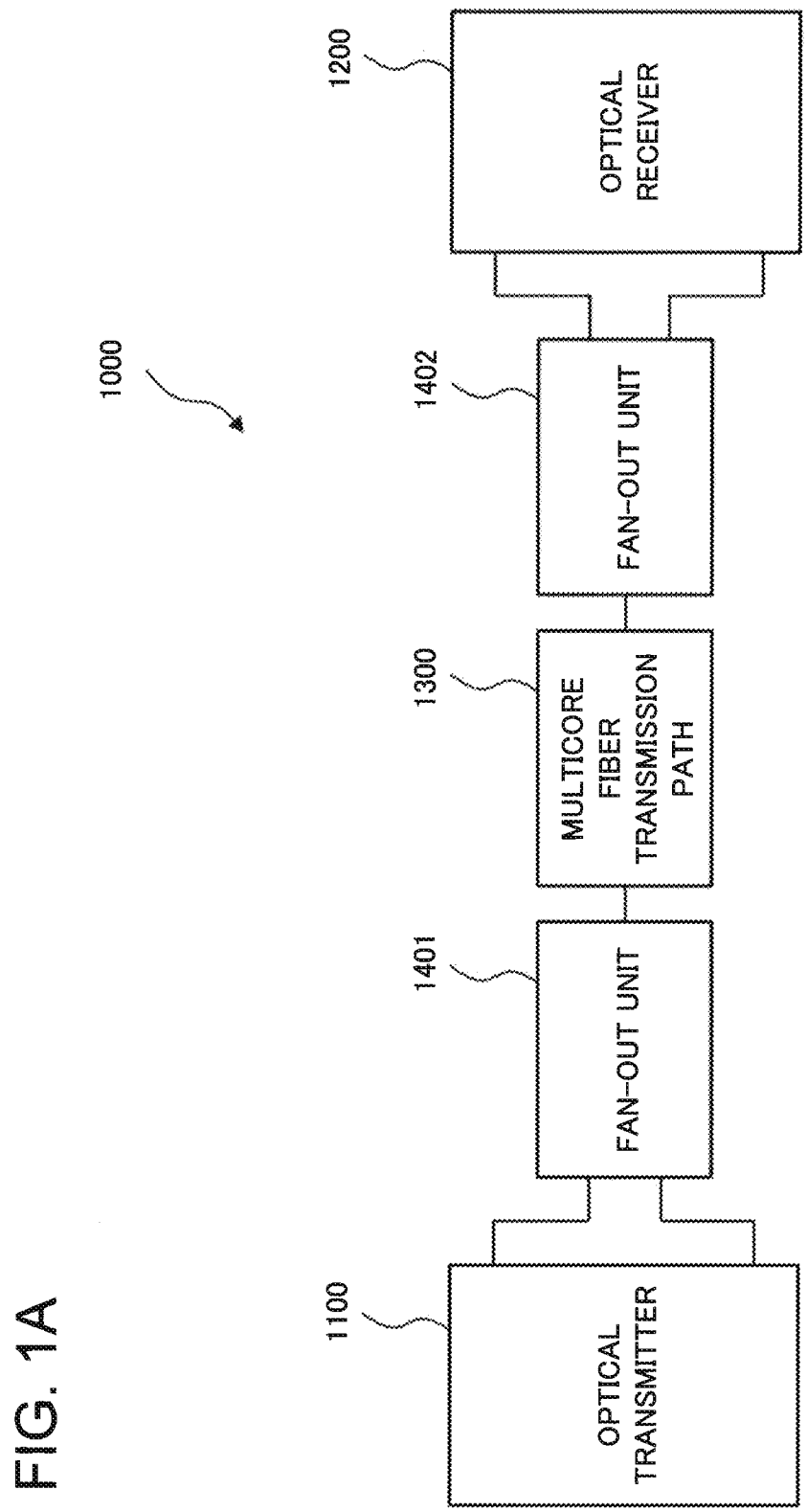
FIG. 1A is a block diagram illustrating a configuration of an optical transmission system according to a first example embodiment of the present invention.

FIG. 1A is a block diagram illustrating a configuration of an optical transmission system 1000 according to a first example embodiment of the present invention. The optical transmission system 1000 includes an optical transmitter 1100, an optical receiver 1200, and a multicore fiber transmission path 1300 serving as a spatial multiplexing transmission path including a plurality of paths multiplexed spatially. The optical transmitter 1100 sends an optical signal to each of the plurality of paths of the multicore fiber transmission path 1300, and the optical receiver 1200 receives an optical signal propagated through each of the plurality of paths.

Figure 1B:
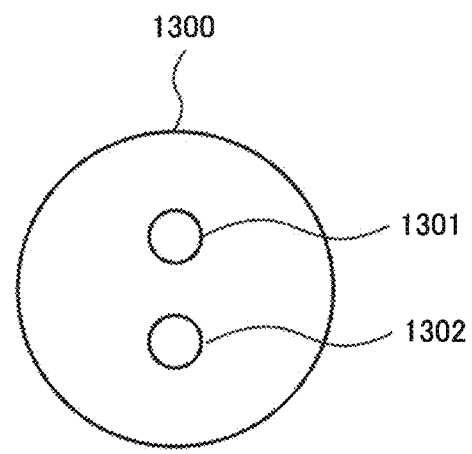
FIG. 1B is a cross-sectional view of a multicore fiber transmission path included in the optical transmission system according to the first example embodiment of the present invention.

FIG. 1B illustrates a cross-sectional view of the multicore fiber transmission path 1300 according to the present example embodiment. In the present example embodiment, an example will be described in which a multicore fiber transmission path having two cores of a first core 1301 and a second core 1302, as illustrated in FIG. 1B, is used. The wavelength division multiplexing (WDM) is not performed in the example. FIG. 1A illustrates the configuration including fan-out units 1401 and 1402.

The optical transmitter 1100 generates two optical signals to be sent to the first core 1301 and the second core 1302. In the optical transmitter, optical components based on a common single mode fiber are used.

The two optical signals generated by the optical transmitter 1100 are coupled to the multicore fiber transmission path 1300 through the fan-out unit 1401. The fan-out units 1401 and 1402 are devices that couple a plurality of single mode fibers to a single multicore fiber or perform the reverse process, and specifically are configured by a thin fiber bundle and the like. The multicore fiber transmission path 1300 is configured by a multicore fiber having two cores and an optical amplifier to compensate for transmission loss of the multicore fiber, and the like. The optical signals propagated through the multicore fiber transmission path 1300 are coupled to two single mode fibers by the fan-out unit 1402, and each of the optical signals is inputted into and received in the optical receiver 1200.

Figure 2:
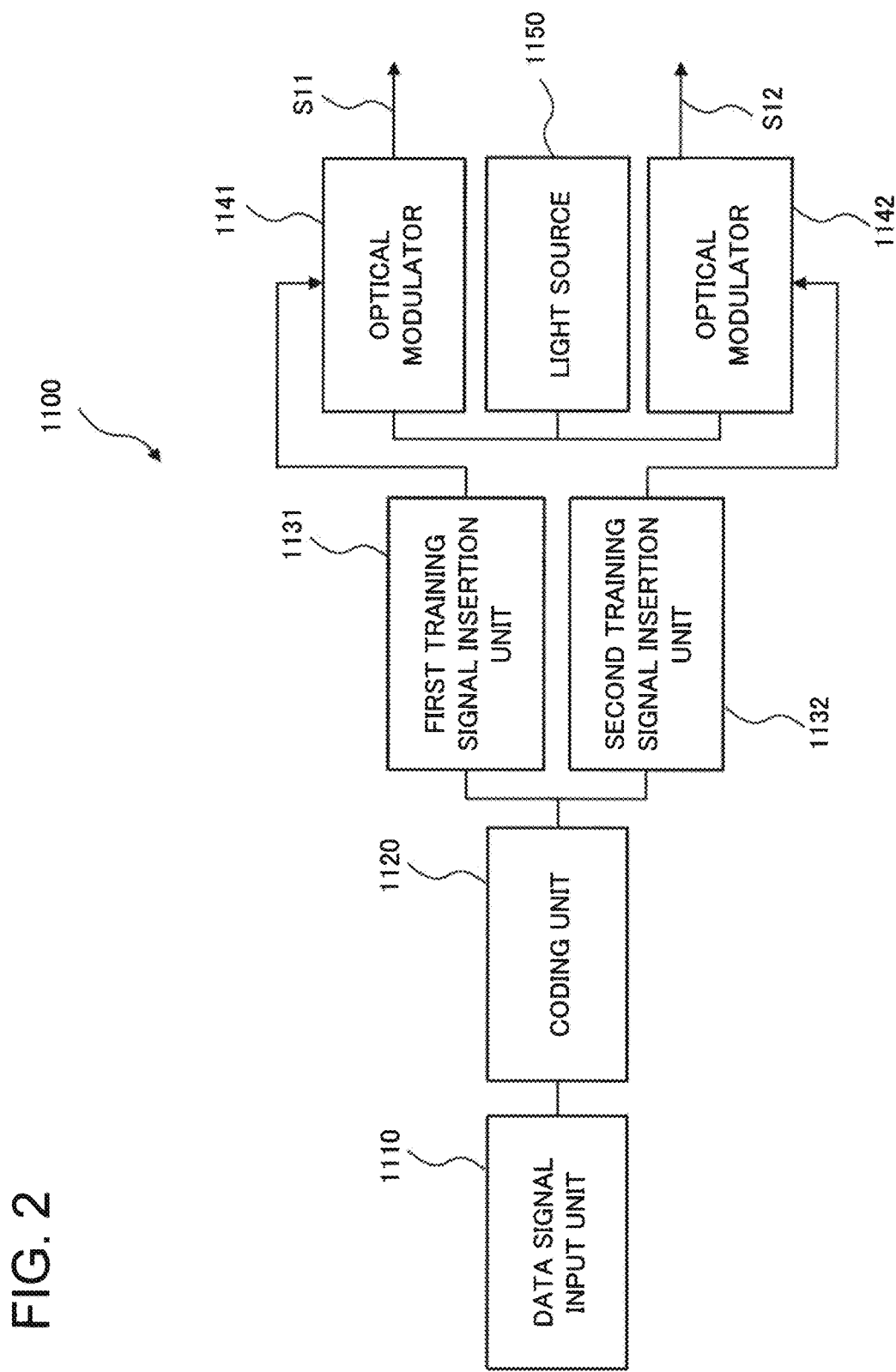
FIG. 2 is a block diagram illustrating a configuration of an optical transmitter included in the optical transmission system according to the first example embodiment of the present invention.

FIG. 2 illustrates a configuration of the optical transmitter 1100 according to the present example embodiment.

The optical transmitter 1100 includes a data signal input unit 1110, a coding unit 1120, a first training signal insertion unit 1131, a second training signal insertion unit 1132, optical modulators 1141 and 1142, and a light source 1150. The data signal input unit 1110, the coding unit 1120, the first training signal insertion unit 1131, and the second training signal insertion unit 1132 constitute data signal sequence generation means. The data signal sequence generation means generates a plurality of data signal sequences corresponding to a plurality of paths (cores), each of the plurality of data signal sequences obtained by inserting periodically a training signal with a plurality of frequency components in a data signal. The optical modulators 1141 and 1142 and the light source 1150 constitute optical modulation means, which generates a plurality of optical signals by modulating optical carriers respectively with the plurality of data signal sequences.

A data signal to be transmitted is coded by the coding unit 1120, and turns to two data signals to generate optical signals that are sent to the respective cores. In the present example embodiment, an example will be described in which two data signals described in Non Patent Literature 1 are the same, and a diversity effect due to a plurality of paths can be achieved.

The first training signal insertion unit 1131 inserts a first training signal in a data signal to generate an optical signal that is sent to the first core 1301. The second training signal insertion unit 1132 inserts a second training signal in a data signal to generate an optical signal that is sent to the second core 1302. In the plurality of data signal sequences in which the training signals are inserted respectively as described above, the training signals respectively included in the data signal sequences to be propagated through adjacent paths (cores) at least have different frequency components from each other at the same timing. Each of the plurality of training signals included in a single data signal sequence has a plurality of frequency components whose frequency difference differs depending on a position to be inserted.

The two optical modulators 1141 and 1142 are respectively driven by such data signal sequences, and two optical signals are generated that are respectively sent to the first core 1301 and the second core 1302, that is, a first core optical transmission signal S11 and a second core optical transmission signal S12. The two optical modulators 1141 and 1142 respectively receive input of laser light beams obtained by dividing into two beams the output from a single laser light source serving as the light source 1150.

Figure 3:
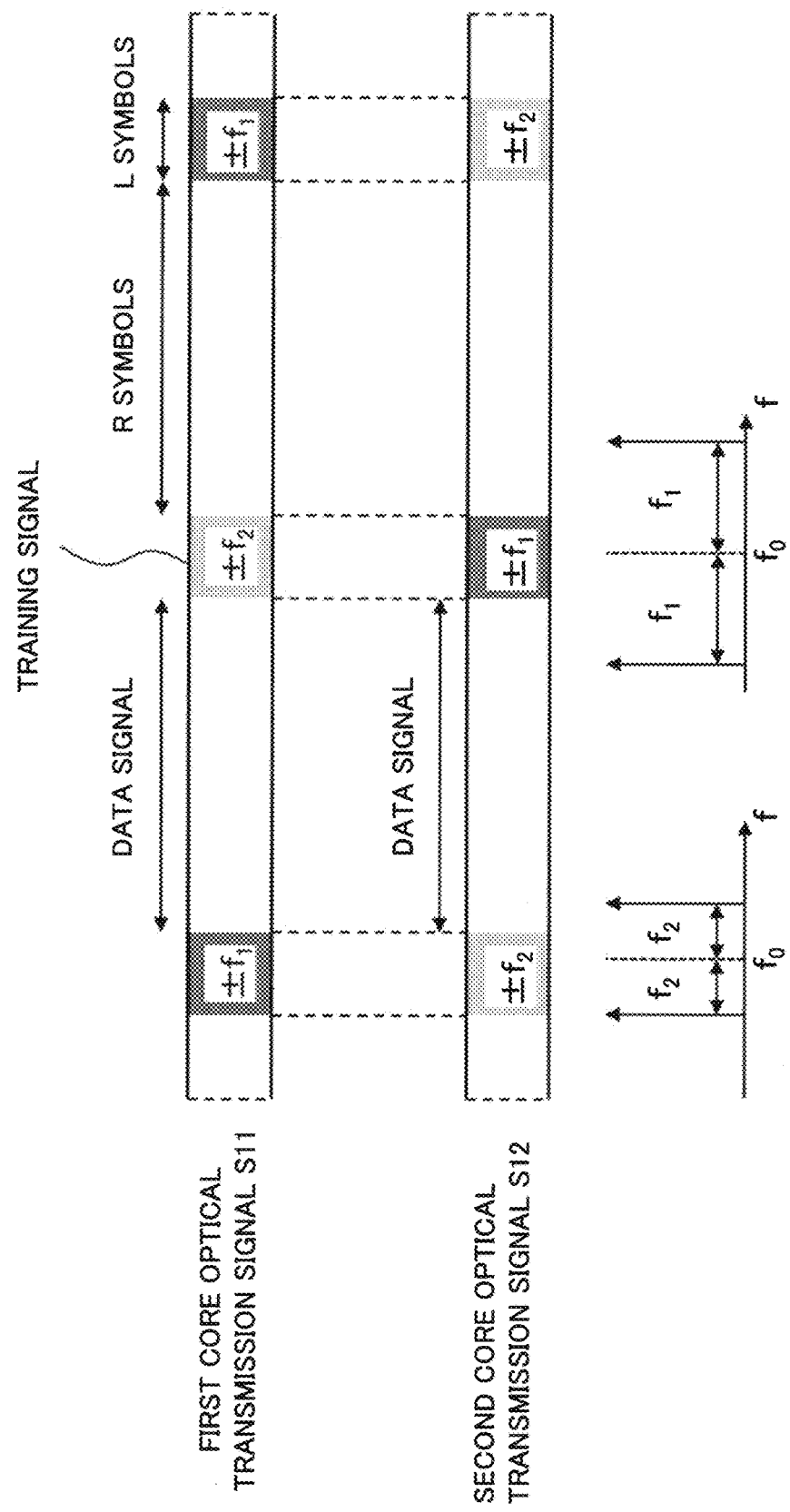
FIG. 3 is a diagram to describe a training signal inserted by the optical transmitter included in the optical transmission system according to the first example embodiment of the present invention.

The above-mentioned training signal to be inserted by the optical transmitter 1100 of the present example embodiment will be described in more detail using FIG. 3.

The training signals each of which has L symbols at intervals of R symbols are inserted at the same timing in the respective optical transmission signals S11 and S12 to be sent to the first core 1301 and the second core 1302. That is to say, the training signal periodically begins every R+L symbols. Into the first core optical transmission signal S11 to be sent to the first core 1301, a frequency signal with frequency $\pm f_1$ and a frequency signal with frequency $\pm f_2$ are alternately inserted. That is to say, for the optical carrier of the optical transmission signal set at frequency $f_0$, the frequency signals with frequencies $f_0 \pm f_1$ and $f_0 \pm f_2$ are alternately inserted. The frequency signal having such a specific frequency component can be generated using a digital-to-analog converter (DAC). Alternatively, the frequency signal can be generated by repeating specific symbols such as [+1, −1] or [+1, +1, −1, −1], as described in above-mentioned Patent Literature 1.

Into the second core optical transmission signal S12 to be sent to the second core 1302, a frequency signal with frequency $\pm f_1$ and a frequency signal with frequency $\pm f_2$ are alternately inserted in a similar way. However, in this case, the frequency signal with frequency $\pm f_2$ is inserted at the timing when the frequency signal with frequency $\pm f_1$ is inserted into the optical transmission signal S11 to be sent to the first core. In reverse, the frequency signal with frequency $\pm f_1$ is inserted at the timing when the frequency signal with frequency $\pm f_2$ is inserted into the optical transmission signal S11 to be sent to the first core. With a symbol rate of the optical transmission signal set at f, $f_1$ is set at f/2, and $f_2$ is set at f/4.

This enables the training signal inserted in each of the optical signals to be sent to different paths to have a different frequency component that can be discriminated at each timing. In addition, it can be configured that a training signal with frequency components of a pair of signals whose frequency difference is maximized (a frequency signal with frequency $\pm f_1$) appears at a constant frequency in the training signals periodically inserted into each optical signal. In this case, the frequency signal with frequency $\pm f_1$ appears every 2(R+L) symbols that represents a period twice as long as a cycle at which the training signal is inserted.

It is the same if a multicore fiber transmission path including N cores is used; for example, N types of frequency signals with frequencies $\pm f_1, \pm f_2, \ldots,$ and $\pm f_N$ ($f_n = f/(n+1)$) are repeatedly inserted beginning with frequency $f_1$ in order of $\pm f_1, \pm f_2, \ldots,$ and $\pm f_N$ in the first core. In a k-th core, the frequency signals are repeatedly inserted beginning with frequency $f_k$ in order of $\pm f_k, +f_{k+1}, \ldots,$ and $\pm f_{k+N}$. The subscript represents an integer modulo N. This enables the training signal to appear which has a different frequency component that can be discriminated at each timing, and has frequency components of a pair of signals whose frequency difference is maximized at a constant frequency in the training signals periodically inserted into each optical signal. The patterns of the training signals to be inserted are the same in optical signals to be sent to all cores at different timings.

Figure 4:
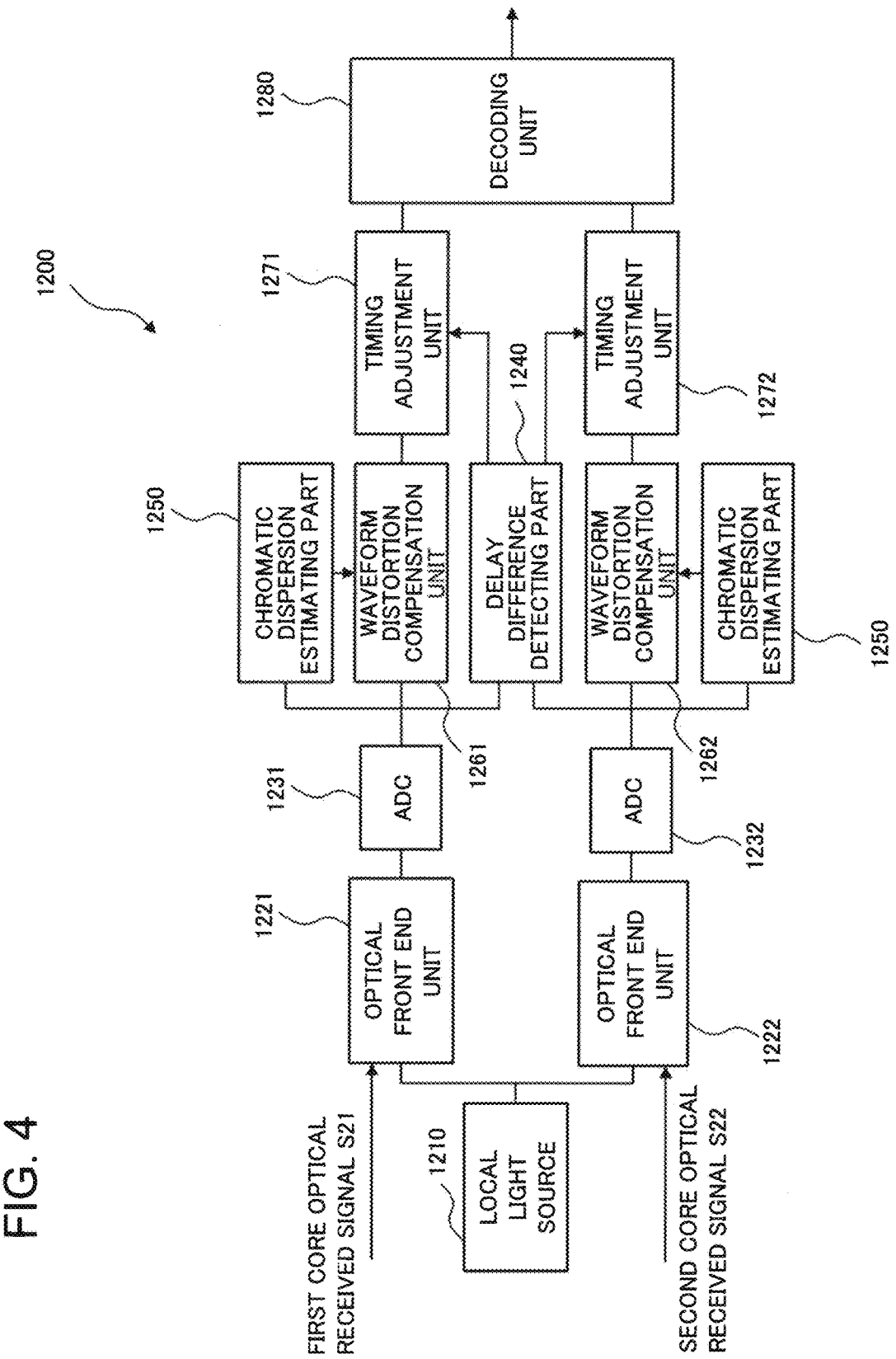
FIG. 4 is a block diagram illustrating a configuration of an optical receiver according to the first example embodiment of the present invention.

FIG. 4 illustrates a configuration of the optical receiver 1200 included in the optical transmission system 1000 according to the present example embodiment.

The optical receiver 1200 includes a local light source 1210, optical front end units 1221 and 1222, and analog-to-digital converters (ADCs) 1231 and 1232. These components constitute optical detection means, which receives and detects a first core optical received signal S21 and a second core optical received signal S22 that are a plurality of optical signals having been propagated through the plurality of paths respectively, and outputs a plurality of data signal sequences.

The optical receiver 1200 further includes a delay difference detecting part 1240, a chromatic dispersion estimating part 1250, waveform distortion compensation units 1261 and 1262, timing adjustment units 1271 and 1272, and a decoding unit 1280. The delay difference detecting part 1240 (propagation delay difference calculation means) and the chromatic dispersion estimating part 1250 (chromatic dispersion amount calculation means) constitute optical signal information detection means. The optical signal information detection means calculates a propagation delay difference between a plurality of paths and chromatic dispersion amounts in the plurality of paths from a plurality of frequency components included in training signals constituting data signal sequences output from the optical detection means.

The propagation delay difference calculation means can be configured to calculate the propagation delay difference between the plurality of paths from detection times of different frequency components included in the training signals at the same timing in the plurality of data signal sequences output from the optical detection means. The chromatic dispersion amount calculation means obtains a delay time from a difference in detection time between the plurality of frequency components using a training signal with a maximum frequency difference between the plurality of frequency components included in the data signal sequences output from the optical detection means. The chromatic dispersion amount calculation means can be configured to calculate respectively chromatic dispersion amounts in the plurality of paths by above-described way.

Next, the operation of the optical receiver 1200 will be described in more detail.

The optical received signals S21 and S22 received from the first core and the second core are respectively inputted into the optical front end units 1221 and 1222 and are coherently detected. The optical front end units 1221 and 1222 respectively receive input of laser light beams, as local oscillation light, obtained by dividing into two beams the output of the local light source 1210. Each of the optical front end units 1221 and 1222 is composed of a polarization multiplexing 90-degree optical hybrid, a balanced photodetector, a transimpedance amplifier and the like. The optical front end unit using the polarization multiplexing 90-degree optical hybrid outputs four types in total of signals of an in-phase (I) component and a quadrature (Q) component for each of an X polarized wave and a Y polarized wave; however, FIG. 4 illustrates them with a single line for simplicity.

Each output from the optical front end units 1221 and 1222 is sampled by the analog-to-digital converter (ADC) 1231 or 1232, undergoes waveform distortion compensation by digital signal processing and timing adjustment to compensate for delay difference between cores, and then is decoded. The waveform distortion compensation units 1261 and 1262 perform chromatic dispersion compensation, polarization mode dispersion compensation, and polarization separation. FIG. 4 illustrates a configuration in which a waveform distortion compensation process is independently performed on the received signal from each core. However, the present example embodiment is not limited to this; if the crosstalk between a plurality of paths becomes problematic, it is possible to perform the waveform distortion compensation process collectively on a plurality of received signals as with a MIMO (multiple-input multiple-output) process. In this case, it is possible to perform whole or part of the timing adjustment function in the MIMO process.

The decoding unit 1280 discriminates data using the plurality of received signals. In this case, the discrimination can be performed after adding to each other two received signals in synchronized timing inclusive of phase, as described in the above-mentioned Non Patent Literature 1.

The delay difference detecting part 1240, serving as the propagation delay difference calculation means, calculates a first average detection time that is an average value of respective detection times of frequency components that have the same absolute value and opposite signs, and that differ from each other and are included in a first training signal constituting a first data signal sequence of the plurality of data signal sequences. Similarly, the delay difference detecting part 1240 calculates a second average detection time that is an average value of respective detection times of frequency components that have the same absolute value and opposite signs, and that differ from each other and are included in a second training signal constituting a second data signal sequence different from the first data signal sequence of the plurality of data signal sequences. Then the delay difference detecting part 1240 calculates a propagation delay difference by obtaining the difference between the first average detection time and the second average detection time.

Figure 5:
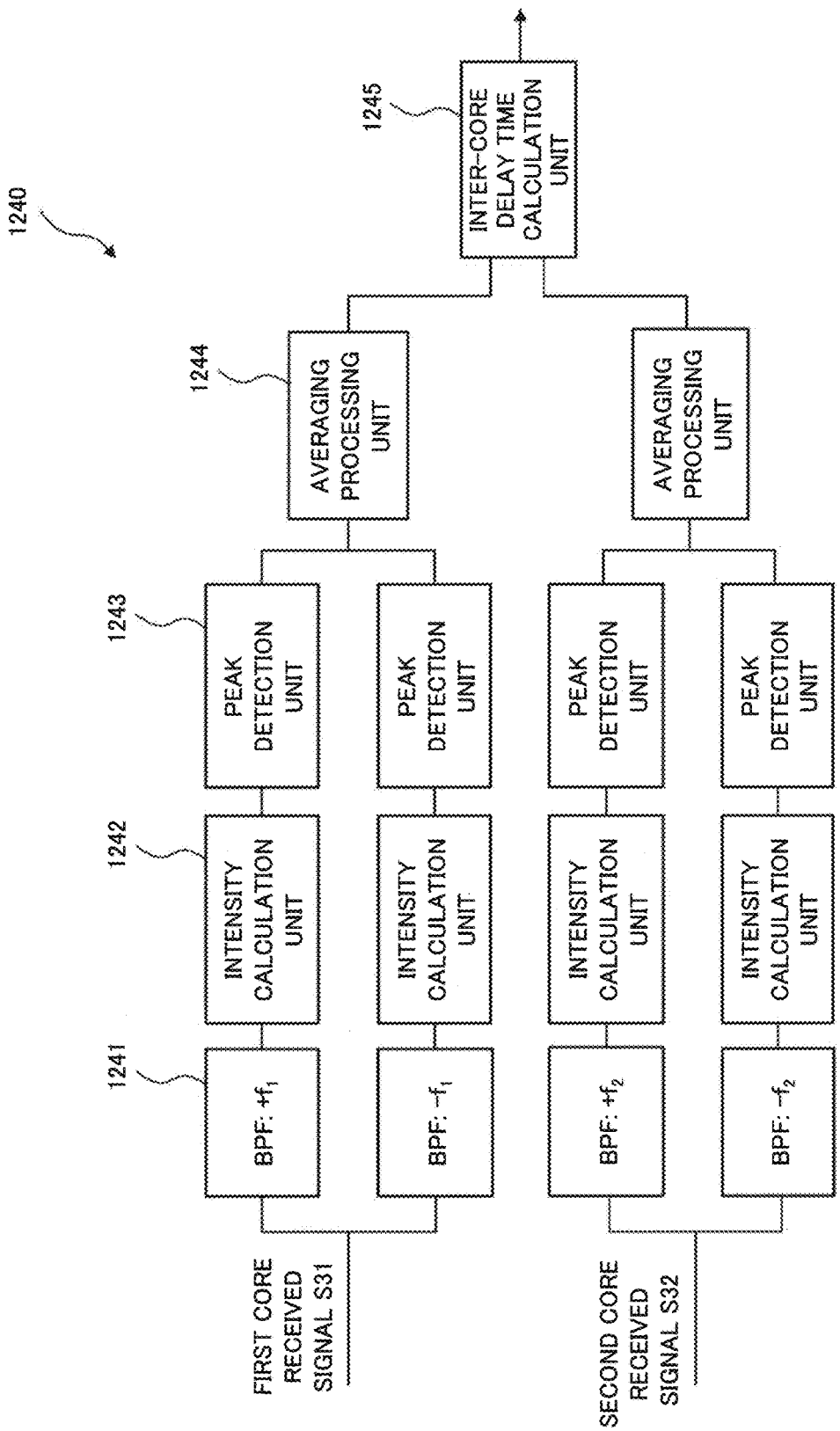
FIG. 5 is a block diagram illustrating a configuration of a delay difference detecting part included in the optical receiver according to the first example embodiment of the present invention.

FIG. 5 illustrates a configuration of the delay difference detecting part 1240. The delay difference detecting part 1240 includes a band pass filter (BPF) 1241, an intensity calculation unit 1242, a peak detection unit 1243, an averaging processing unit 1244, and an inter-core delay time calculation unit 1245.

A first core received signal S31 and a second core received signal S32, which are the outputs of the analog-to-digital converters (ADCs) 1231 and 1232, are respectively divided into two signals. One of the divided two signals passes through the band pass filter 1241 with the center frequency $+f_1$, and then its intensity is calculated by the intensity calculation unit 1242. The peak detection unit 1243 detects a timing when the intensity calculated by the intensity calculation unit 1242 reaches its peak. The other of the divided received signals passes through the band pass filter 1241 with the center frequency $-f_1$, and then its intensity is calculated by the intensity calculation unit 1242 in a similar manner. Then the peak detection unit 1243 detects a timing when the intensity reaches its peak.

These series of processes can also be performed in a frequency domain. In such a case, first, the signals are converted into the frequency domain by performing the FFT (Fast Fourie Transform) processing on the signals ranging from sampling time $t_0$ to $t_0+L_0 T s$. $T_s$ represents a symbol time, and $L_0$ represents the number of symbols included in one frame of the FFT. The process of extracting the intensity of the component with frequency $+f_1$ is performed with the sampling time $t_0$ varying, which makes it possible to detect a timing at peak.

The averaging processing unit 1244 performs an averaging process on the timing values of the detected two peaks. The delay amount of the frequency component due to the chromatic dispersion is approximately proportional to the frequency difference and antisymmetric about frequency 0.

Consequently, the timing value after undergoing the averaging process represents a propagation delay in the first core with respect to the component with frequency 0, regardless of a frequency component included in the frequency signal. Similarly, a value representing propagation delay in the second core with respect to the component with frequency 0 is calculated from the second core received signal S32 that is the output of the analog-to-digital converter (ADC) 1232.

For the received signal S32 propagated through the second core, a band pass filter with center frequency $+f_2$ or $-f_2$ is used. Accordingly, even if the frequency signal with frequency $+f_1$ inserted into the first core at the same timing is mixed due to a crosstalk during the propagation, it is unaffected to calculate the value representing the propagation delay in the second core. This is similarly applied to calculating the propagation delay in the first core. The calculated propagation delay amount does not represent an absolute amount of the propagation delay; however, a relative propagation delay difference can be obtained by calculating the difference between the propagation delay amount in the first core and the propagation delay amount in the second core that are calculated by the above-described manner.

As mentioned above, the propagation delay difference between a plurality of paths can be obtained with crosstalk tolerance and without the influence of the chromatic dispersion. The detectable propagation delay difference is determined by a cycle at which training signals are inserted. Taking into account the mixing of frequency components due to a crosstalk, the detectable propagation delay difference is approximately $\pm R$ symbols.

Figure 6:
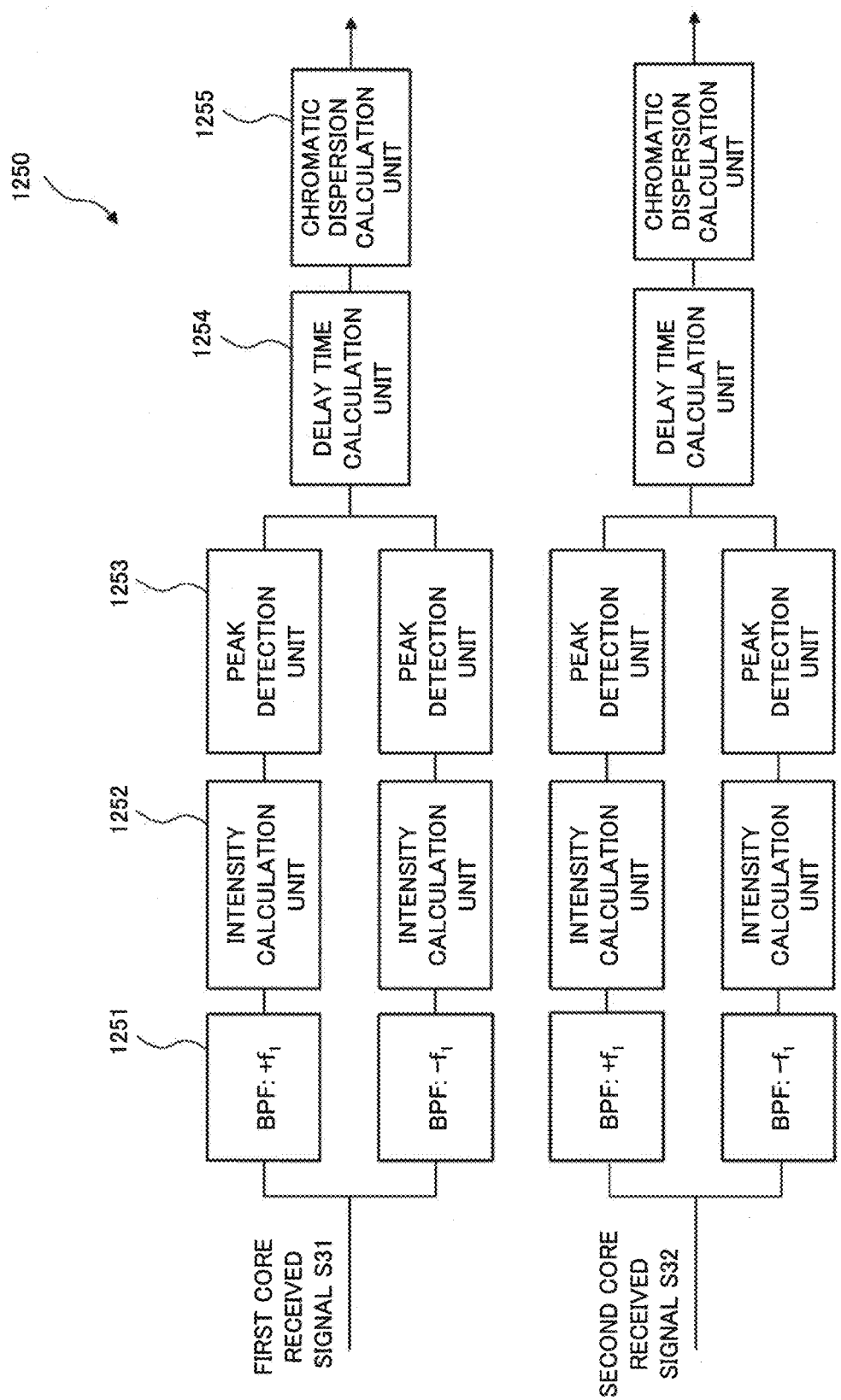
FIG. 6 is a block diagram illustrating a configuration of a chromatic dispersion estimating part included in the optical receiver according to the first example embodiment of the present invention.

FIG. 6 illustrates a configuration of the chromatic dispersion estimating part 1250 included in the optical receiver 1200 according to the present example embodiment. The chromatic dispersion estimating part 1250 includes a band pass filter (BPF) 1251, an intensity calculation unit 1252, a peak detection unit 1253, a delay time calculation unit 1254, and a chromatic dispersion calculation unit 1255.

The chromatic dispersion estimation process in the chromatic dispersion estimating part 1250 is performed independently of the received signal received in each core. The first core received signal S31 and the second core received signal S32, which are the outputs of the analog-to-digital converters (ADCs) 1231 and 1232, are respectively divided and inputted into the chromatic dispersion estimating part 1250. Then the outputs of the chromatic dispersion estimating part 1250 are sent to the waveform distortion compensation units 1261 and 1262, in which chromatic dispersion compensation amounts in the received signals S31 and S32 received in each core are determined.

One of the evenly divided received signals passes through the band pass filter 1251 with center frequency $+f_1$, the other one passes through the band pass filter with center frequency $-f_1$, and then their intensities are calculated in the intensity calculation units 1252. The peak detection unit 1253 detects a timing when the intensity calculated by the intensity calculation unit 1252 reaches its peak. The delay time calculation unit 1254 calculates a delay time between two types of frequency components from the difference between the respective timings detected by the peak detection units 1253. The chromatic dispersion calculation unit 1255 converts the chromatic dispersion amount calculated from the delay time into a desired format and outputs the converted chromatic dispersion amount to the waveform distortion compensation units 1261 and 1262. The chromatic dispersion estimating part 1250 uses as a training signal the frequency signal having the frequency $+f_1$ whose frequency difference is maximized for each of the first core received signal S31 and the second core received signal S32.

As described above, it is possible to use, for all the received signals each of which has been propagated through the core, the training signal that is inserted at a constant frequency and has a pair of frequency components whose frequency difference is maximized. This makes it possible to perform the high-accuracy chromatic dispersion compensation as heretofore. As a result, it becomes possible to detect the delay difference between a plurality of received signals that have been propagated through a plurality of paths before each signal is decoded without a lot of influence of the crosstalk between the plurality of paths and the chromatic dispersion in each path.

Figure 7:
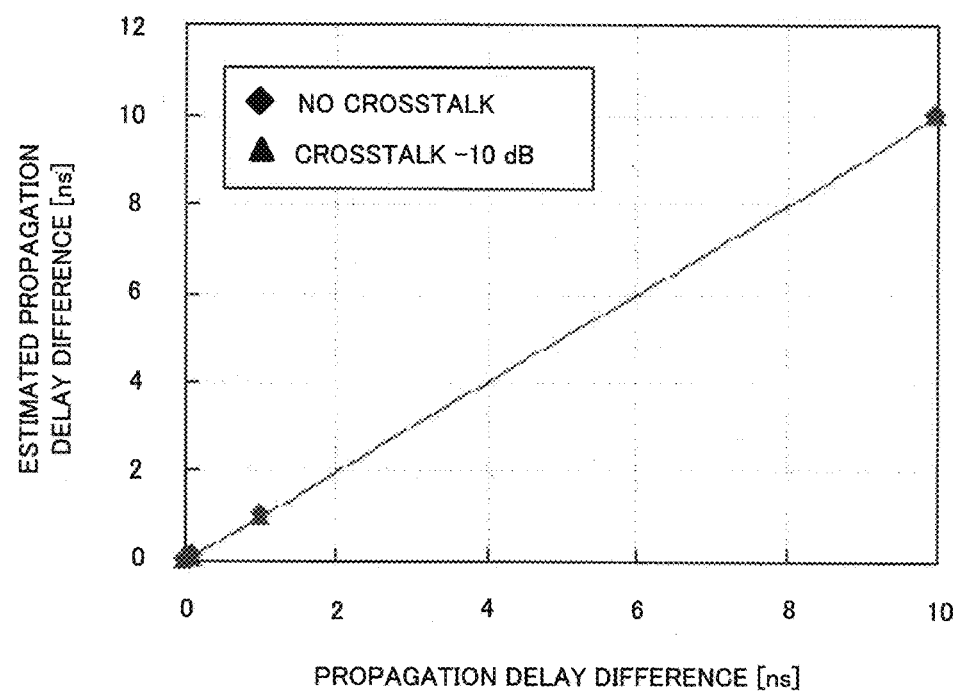
FIG. 7 is a diagram illustrating simulation results of the operation of a delay difference detecting part included in the optical receiver according to the first example embodiment of the present invention.

FIG. 7 illustrates simulation results, obtained in numerical calculations, of the propagation delay difference detected by the delay difference detecting part 1240 according to the present example embodiment. In this case, signals are transmitted using a multicore fiber having two cores. The horizontal axis represents a simulated propagation delay difference between cores, and the vertical axis represents an estimated propagation delay difference. The simulations have been performed for a case with no inter-core crosstalk accumulated during the transmission and a case with crosstalk −10 dB in total.

The simulation conditions are as follows. The modulation scheme of optical signals to be sent to each core of a multicore fiber having two cores is a polarization multiplexing QPSK scheme, and the symbol rate f is set at 32 GHz. The training signal with 256 symbols is inserted into the first core at intervals of $2^{14}$ symbols. The same training signal is used for both polarizations.

The training signal inserted into the first core is configured to include the frequency signal with frequency $\pm f/2$ having 128 symbols at both ends of which the frequency signal with frequency $\pm f/8$ having 64 symbols is provided as a guard interval. The configuration makes it possible to improve the detection accuracy of a timing when the intensity of the frequency component reaches its peak, as described in the above-mentioned Patent Literature 1.

The training signal inserted into the second core is configured to include the frequency signal with frequency $\pm f/4$ having 128 symbols at both ends of which the frequency signal with frequency $\pm f/8$ having 64 symbols is provided as a guard interval. The characteristics of the multicore fiber transmission path are simulated by employing chromatic dispersion accumulation and polarization state variation that are independent in each core and a crosstalk between cores as one unit and cascading this 100 times. The total amount of the chromatic dispersion accumulation in each core is set at 17,000 ps/nm.

From the results illustrated in FIG. 7, it can be understood that almost the same value as the simulated propagation delay difference between the cores is obtained as the estimation results for each of the case with no crosstalk between the cores and the case with crosstalk of −10 dB. In this simulation, low speed frequency signals having frequencies different from each other are used as guard intervals. The present example embodiment is not limited to this, and it is also possible to improve the accuracy of the delay difference detection by adding a pattern in which the size of a cross-correlation function such as predetermined PRBS (pseudo random binary sequence) is rapidly changed depending on a delay difference.

As mentioned above, in the optical transmission system 1000 according to the present example embodiment, the training signals having different frequency components that can be discriminated are inserted into the transmission signals to be sent to different paths. Consequently, even though the training signal is mixed into the received signal received through one path due to the crosstalk from another path, it is possible to separate and remove that training signal because the frequency of the mixed signal component differs. As a result, high crosstalk tolerance can be obtained.

Although the training signal is used that has a different frequency for each of a plurality of paths, it is possible to estimate the influence of the chromatic dispersion and correct it because the frequency of the training signal can be known in advance. This makes it possible to provide high tolerance to the chromatic dispersion and a variation in the chromatic dispersion.

In general, the accuracy of the chromatic dispersion estimation decreases as the frequency difference between two specific frequency components used for the training signal is small. Consequently, if the training signals having different frequencies are uniformly used for a plurality of paths, the accuracy of the chromatic dispersion estimation decreases because it is forced to use a training signal having a small frequency difference for a certain path. As a result, the estimation accuracy of delay difference between paths has the potential to decrease. However, the optical transmission system 1000 according to the present example embodiment is configured to use the training signal having frequency components composed of a pair of signals whose frequency difference is maximized at a constant frequency. The training signal is used for the chromatic dispersion estimation, which makes it possible to estimate the chromatic dispersion amount with high accuracy and to eliminate its influence.

As described above, according to the optical transmission system and the optical receiver of the present example embodiment, it is possible to detect the delay difference between a plurality of signals that have been propagated through a plurality of paths before each signal is decoded without a lot of influence of the crosstalk between the plurality of paths and the chromatic dispersion in each path. This makes it possible to compensate for the delay difference between the plurality of signals; consequently, it becomes possible to make the plurality of signals having been propagated through the plurality of paths cooperate with each other. As a result, it is possible to construct an optical transmission system using a plurality of paths in which the transmission capacity and the transmission distance can be flexibly selected.

Next, a method for detecting optical signal information according to the present example embodiment will be described.

In the method for detecting optical signal information of the present example embodiment, first, a plurality of data signal sequences are generated that correspond to a plurality of paths multiplexed spatially, and each of the plurality of data signal sequences is obtained by inserting periodically a training signal with a plurality of frequency components in a data signal. In the plurality of data signal sequences, the training signals respectively included in the data signal sequences to be propagated through adjacent paths at least have different frequency components from each other at the same timing. In addition, each of the plurality of training signals included in one of the data signal sequences has a plurality of frequency components whose frequency difference differs depending on a position to be inserted. A propagation delay difference between the plurality of paths and chromatic dispersion amounts in the plurality of paths are calculated from the plurality of frequency components included in the training signals having been propagated through the plurality of paths by optical signals.

The propagation delay difference between the plurality of paths can be calculated by using detection times of different frequency components included in the training signals at the same timing in the plurality of data signal sequences having been propagated through the plurality of paths by the optical signals. The chromatic dispersion amounts in the plurality of paths can be calculated by obtaining a delay time from a difference in detection time between the plurality of frequency components using a training signal with a maximum frequency difference between the plurality of frequency components.

The propagation delay difference may be calculated as follows. First, a first average detection time is calculated that is an average value of respective detection times of frequency components that have the same absolute value and opposite signs, and that differ from each other and are included in a first training signal constituting a first data signal sequence of the plurality of data signal sequences. Similarly, a second average detection time is calculated that is an average value of respective detection times of frequency components that have the same absolute value and opposite signs, and that differ from each other and are included in a second training signal constituting a second data signal sequence different from the first data signal sequence of the plurality of data signal sequences. It can be configured to calculate a propagation delay difference by obtaining a difference between the first average detection time and the second average detection time.

As mentioned above, according to the optical transmission system, the optical receiver, and the method for detecting optical signal information of the present example embodiment, it is possible, in the optical transmission system to transmit optical signals using a plurality of adjacent paths, to detect a delay difference between a plurality of paths and chromatic dispersion with a high degree of accuracy even though a crosstalk arises.

Second Example Embodiment

Figure 8:
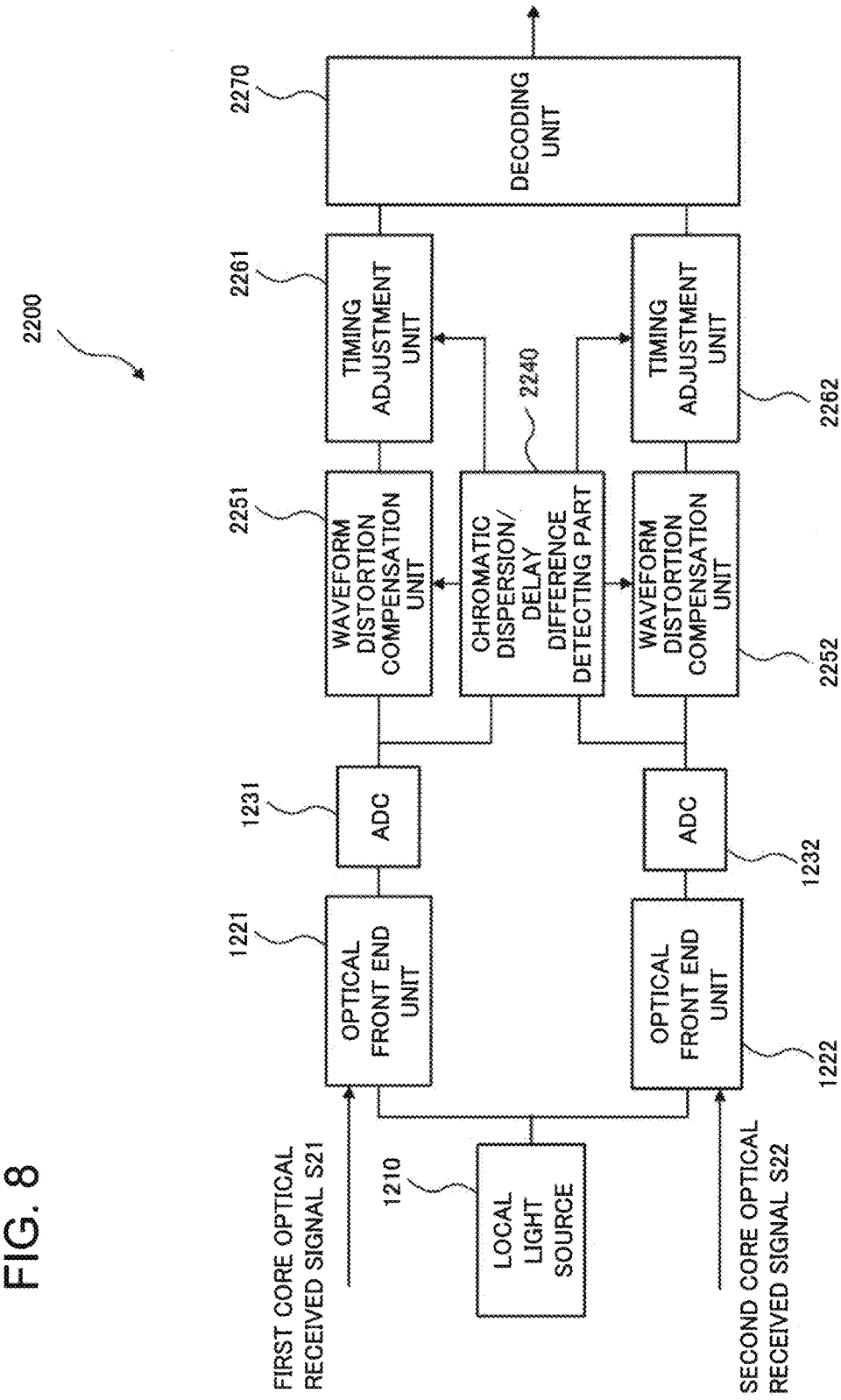
FIG. 8 is a block diagram illustrating a configuration of an optical receiver according to a second example embodiment of the present invention.

Next, a second example embodiment of the present invention will be described. FIG. 8 is a block diagram illustrating a configuration of an optical receiver 2200 according to the second example embodiment of the present invention. An optical transmission system is configured by the optical receiver 2200 according to the present example embodiment and the optical transmitter 1100 and the multicore fiber transmission path 1300 according to the first example embodiment.

The optical receiver 2200 includes the local light source 1210, the optical front end units 1221 and 1222, and the analog-to-digital converters (ADCs) 1231 and 1232. The above configuration is similar to that of the optical receiver 1200 according to the first example embodiment and constitutes the optical detection means.

The optical receiver 2200 further includes a chromatic-dispersion/delay-difference detecting part 2240, waveform distortion compensation units 2251 and 2252, timing adjustment units 2261 and 2262, and a decoding unit 2270.

The chromatic-dispersion/delay-difference detecting part 2240 constitutes the optical signal information detection means including the propagation delay difference calculation means and the chromatic dispersion amount calculation means. The chromatic dispersion amount calculation means, as with that according to the first example embodiment, obtains a delay time from a difference in detection time between the plurality of frequency components using a training signal with a maximum frequency difference between the plurality of frequency components included in the data signal sequences output from the optical detection means. The chromatic dispersion amount calculation means can be configured to calculate respectively chromatic dispersion amounts in the plurality of paths by above-described way.

The propagation delay difference calculation means can be configured to calculate a propagation delay difference by the following operations. That is to say, a first corrected detection time is calculated that is obtained by correcting, using a chromatic dispersion amount in a path through which the first data signal sequence is propagated, a detection time of a frequency component included in a first training signal constituting a first data signal sequence of a plurality of data signal sequences. Similarly, a second corrected detection time is calculated that is obtained by correcting, using a chromatic dispersion amount in a path through which the second data signal sequence is propagated, a detection time of a frequency component included in a second training signal constituting a second data signal sequence that is different from the first data signal sequence of the plurality of data signal sequences. Then the propagation delay difference calculation means can be configured to calculate the propagation delay difference by obtaining a difference between the first corrected detection time and the second corrected detection time.

The optical receiver 1200 according to the above-mentioned first example embodiment, as illustrated in FIG. 4, is configured to detect the propagation delay difference between the plurality of paths and estimate the chromatic dispersion, independently of each other. Because a part of the function of extracting the intensity of a specific frequency component and detecting a timing when the intensity reaches its peak is performed in both the propagation delay difference detection process and the chromatic dispersion estimation process, it can be made common. The optical receiver 2200 according to the present example embodiment is configured to perform the above processes in the chromatic-dispersion/delay-difference detecting part 2240, which enables required circuit resources to decrease.

Figure 9:
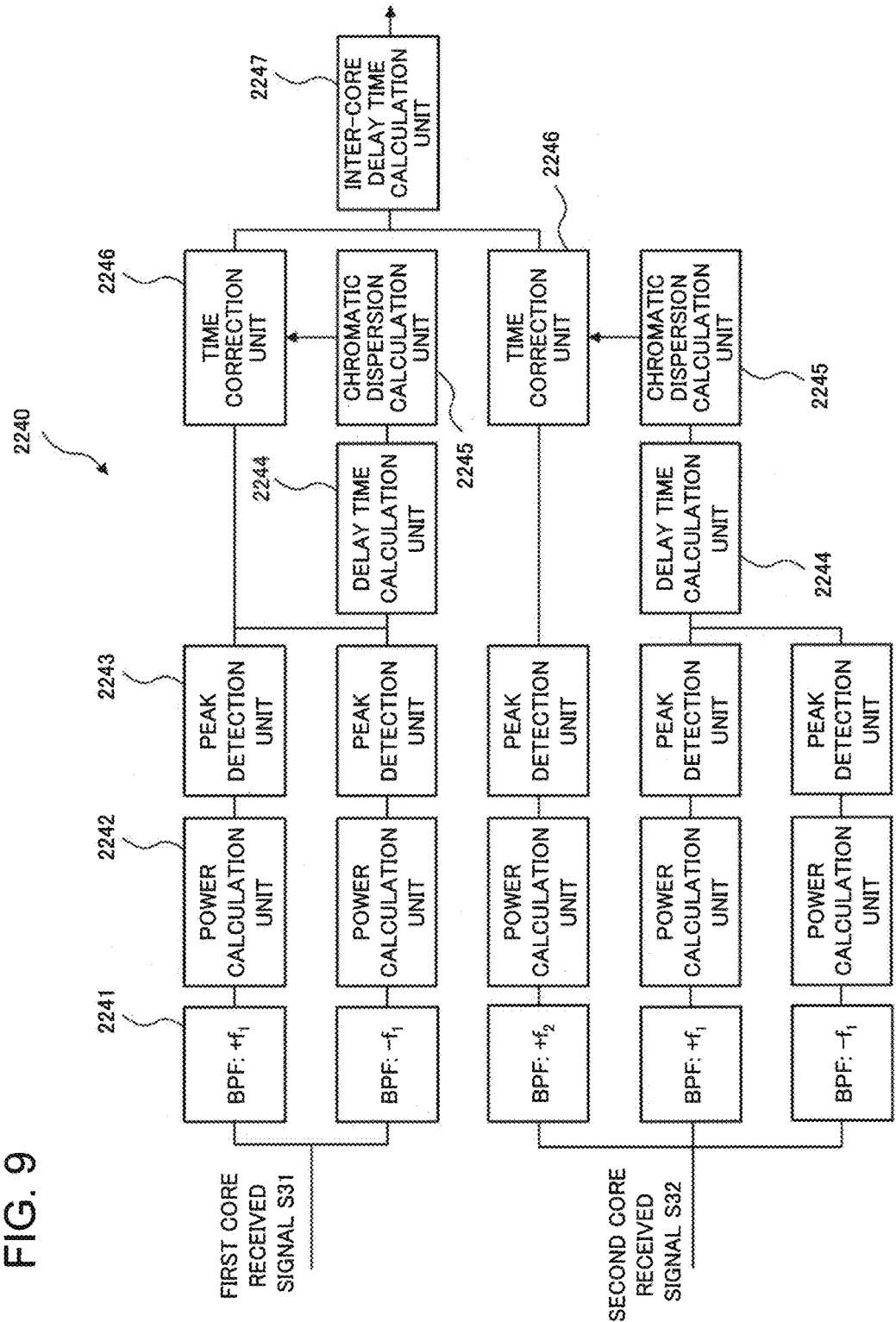
FIG. 9 is a block diagram illustrating a configuration of a chromatic-dispersion/delay-difference detecting part included in the optical receiver according to the second example embodiment of the present invention.

FIG. 9 illustrates a configuration of the chromatic-dispersion/delay-difference detecting part 2240. The chromatic-dispersion/delay-difference detecting part 2240 includes a band pass filter (BPF) 2241, a power calculation unit 2242, a peak detection unit 2243, a delay time calculation unit 2244, a chromatic dispersion calculation unit 2245, a time correction unit 2246, and an inter-core delay time calculation unit 2247.

A first core received signal S31 and a second core received signal S32, which are the outputs of the analog-to-digital converters (ADCs) 1231 and 1232, are inputted into the chromatic-dispersion/delay-difference detecting part 2240. The chromatic dispersion estimation process is performed on each of the first core received signal S31 and the second core received signal S32 using a frequency signal with frequency $\pm f_1$.

For the second core received signal S32, a timing when a frequency component with frequency $+f_2$ output from the band pass filter (BPF) 2241 reaches its peak is further detected by the power calculation unit 2242 and the peak detection unit 2243. A process for detecting a timing when a frequency component with frequency $+f_1$ reaches its peak for the first core received signal S31, which becomes paired with the above, is included in a process for estimating the chromatic dispersion in the first core. The configuration makes it possible to obtain the timing when the frequency component with frequency $+f_1$ included in the first core received signal S31 reaches its peak and the timing when the frequency component with frequency $+f_2$ included in the second core received signal S32 reaches its peak.

These timing values are affected by the chromatic dispersion because the frequencies are different from each other. However, because the chromatic-dispersion/delay-difference detecting part 2240 according to the present example embodiment is configured to include the time correction unit 2246, it is possible to avoid such an influence due to the chromatic dispersion. That is to say, the time correction unit 2246 is configured to correct the timing when the frequency component with frequency $+f_1$ included in the first core received signal S31 reaches its peak using a time delay amount calculated from the chromatic dispersion amount estimated by the chromatic dispersion calculation unit 2245 and the frequency $+f_1$. The time correction unit 2246 is also configured to correct, in a similar manner, the timing when the frequency component with frequency $+f_2$ included in the second core received signal S32 reaches its peak. The inter-core delay time calculation unit 2247 calculates a delay time between the first core received signal S31 and the second core received signal S32 by obtaining a difference between the timings corrected by the time correction unit 2246.

The configuration makes it possible to estimate accurately both the delay difference between a plurality of received signals propagated through a plurality of paths and the chromatic dispersion in each path.

As mentioned above, according to the optical receiver and the optical transmission system of the present example embodiment, it is possible, in the optical transmission system to transmit optical signals using a plurality of adjacent paths, to detect a delay difference between a plurality of paths and chromatic dispersion with a high degree of accuracy even though a crosstalk arises.

Third Example Embodiment

Next, a third example embodiment of the present invention will be described. An optical transmission system according to the present example embodiment differs from the optical transmission system 1000 according to the first example embodiment in the configuration of a multicore fiber transmission path and the configuration of a training signal inserted by an optical transmitter. Because the other configurations are similar to those of the optical transmission system 1000, their descriptions are not repeated.

Figure 10:
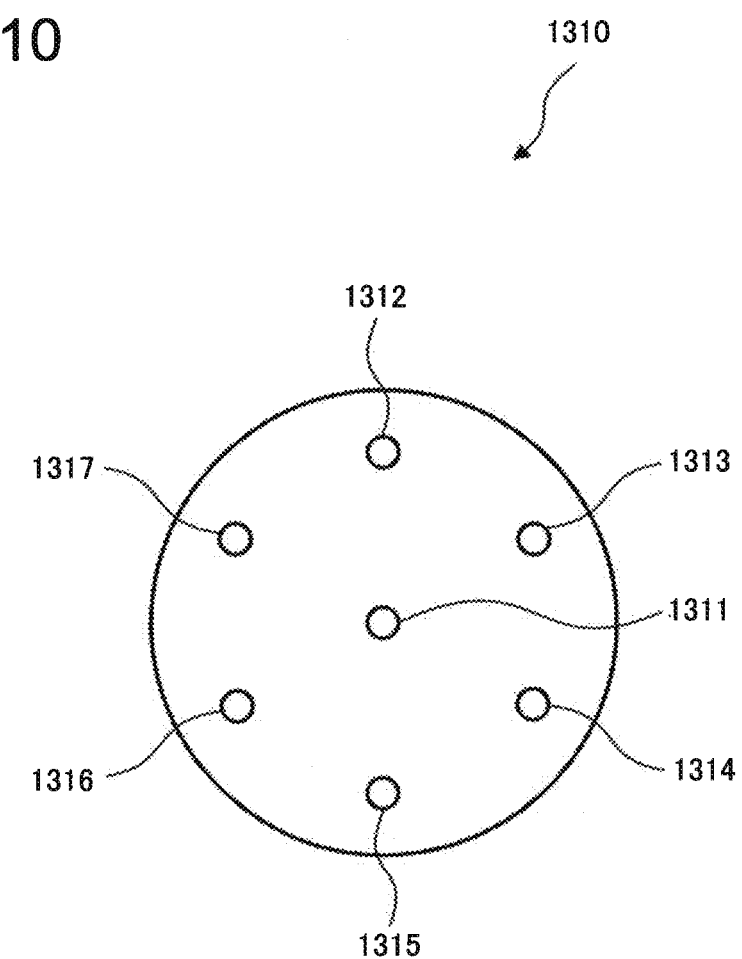
FIG. 10 is a cross-sectional view of a multicore fiber transmission path included in an optical transmission system according to a third example embodiment of the present invention.

FIG. 10 illustrates a cross-sectional view of a multicore fiber transmission path 1310 of the present example embodiment. The multicore fiber transmission path 1310 has a configuration in which seven cores 1311 to 1317 are disposed in a hexagonal geometry.

In the multicore fiber transmission path 1310, for example, the crosstalk arising between the core 1312 and the core 1315 that are not adjacent is small compared to the crosstalk arising between the core 1311 and the core 1312 that are adjacent to each other. Similarly, the crosstalk arising between the core 1312 and the core 1316 that are not adjacent is small compared to the crosstalk arising between the core 1312 and the core 1313 that are adjacent to each other. As described above, the influence of signal mixing due to a crosstalk between cores that are not adjacent can be considered to be small. Consequently, it is possible to use a frequency signal having the same frequency as a training signal in cores that are not adjacent. The configuration makes it possible to reduce the types of frequency signals to be inserted into signals that are propagated through respective cores; therefore, circuit resources can be reduced.

The training signal inserted by the optical transmitter of the present example embodiment will be described using FIG. 11.

In the multicore fiber transmission path 1310, the first core is adjacent to all of the other cores, that is, from a second core to a seventh core, and a core in an even number sequence is not adjacent to at least another core in an even number sequence. Similarly, a core in an odd number sequence except the first core is not adjacent to at least another core in an odd number sequence except the first core. In consideration of the constitutional characteristics of the multicore fiber transmission path 1310, the patterns of the training signals to be inserted can be determined.

Figure 11:
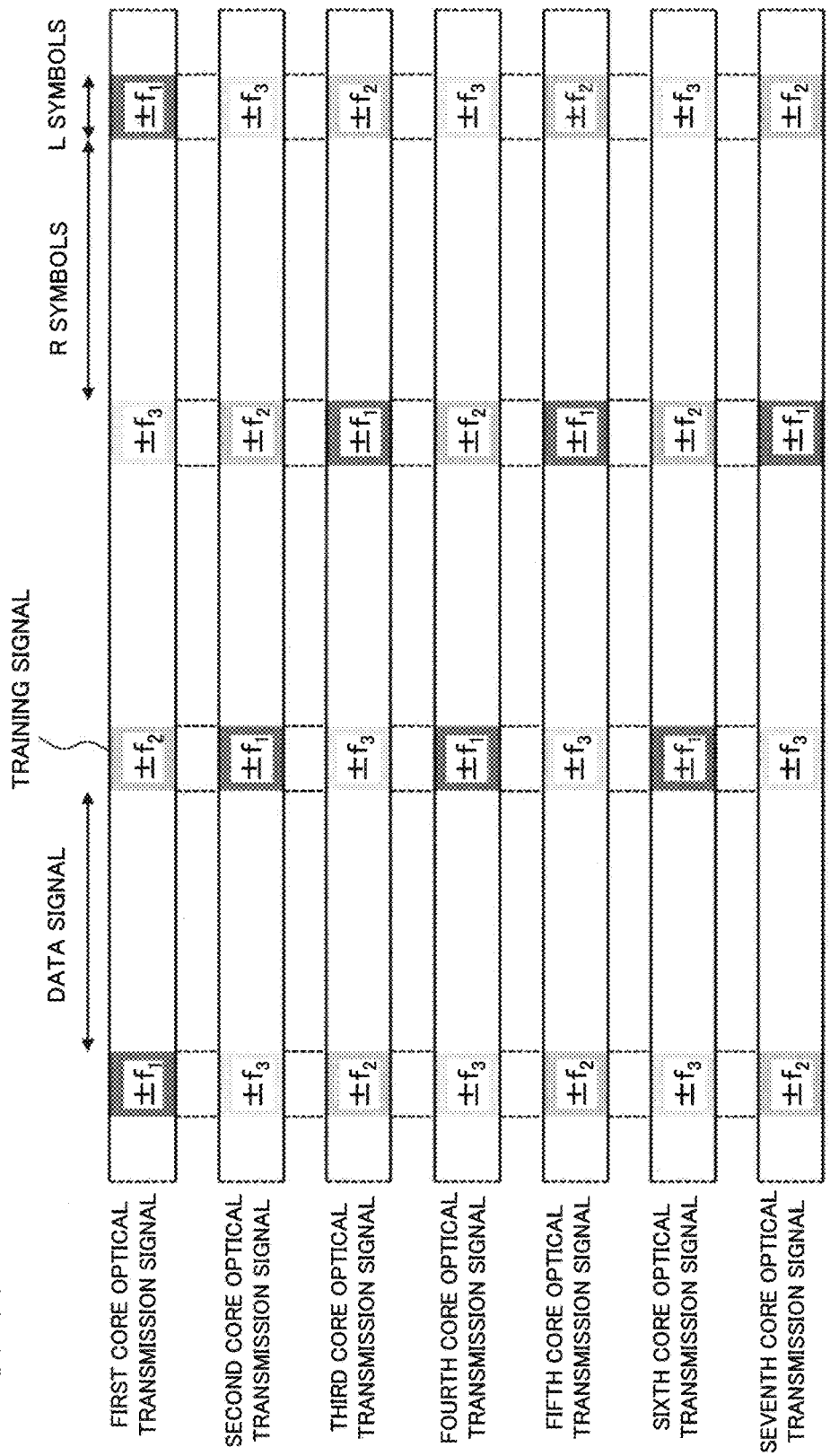
FIG. 11 is a diagram to describe a training signal inserted by an optical transmitter included in the optical transmission system according to the third example embodiment of the present invention.
Figure 12:
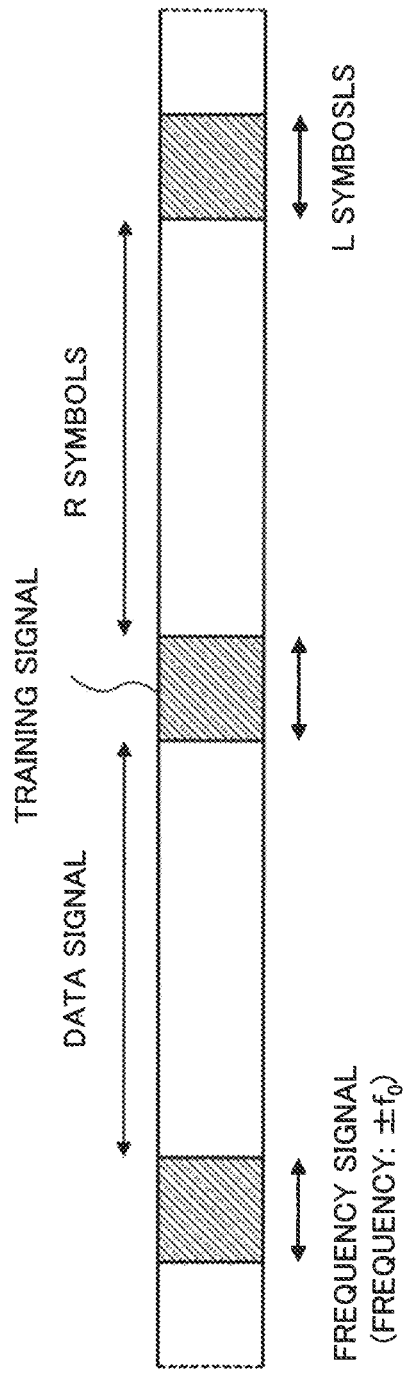
FIG. 12 is a diagram illustrating a transmission signal frame format used in the related chromatic dispersion value calculation method.
Figure 13:
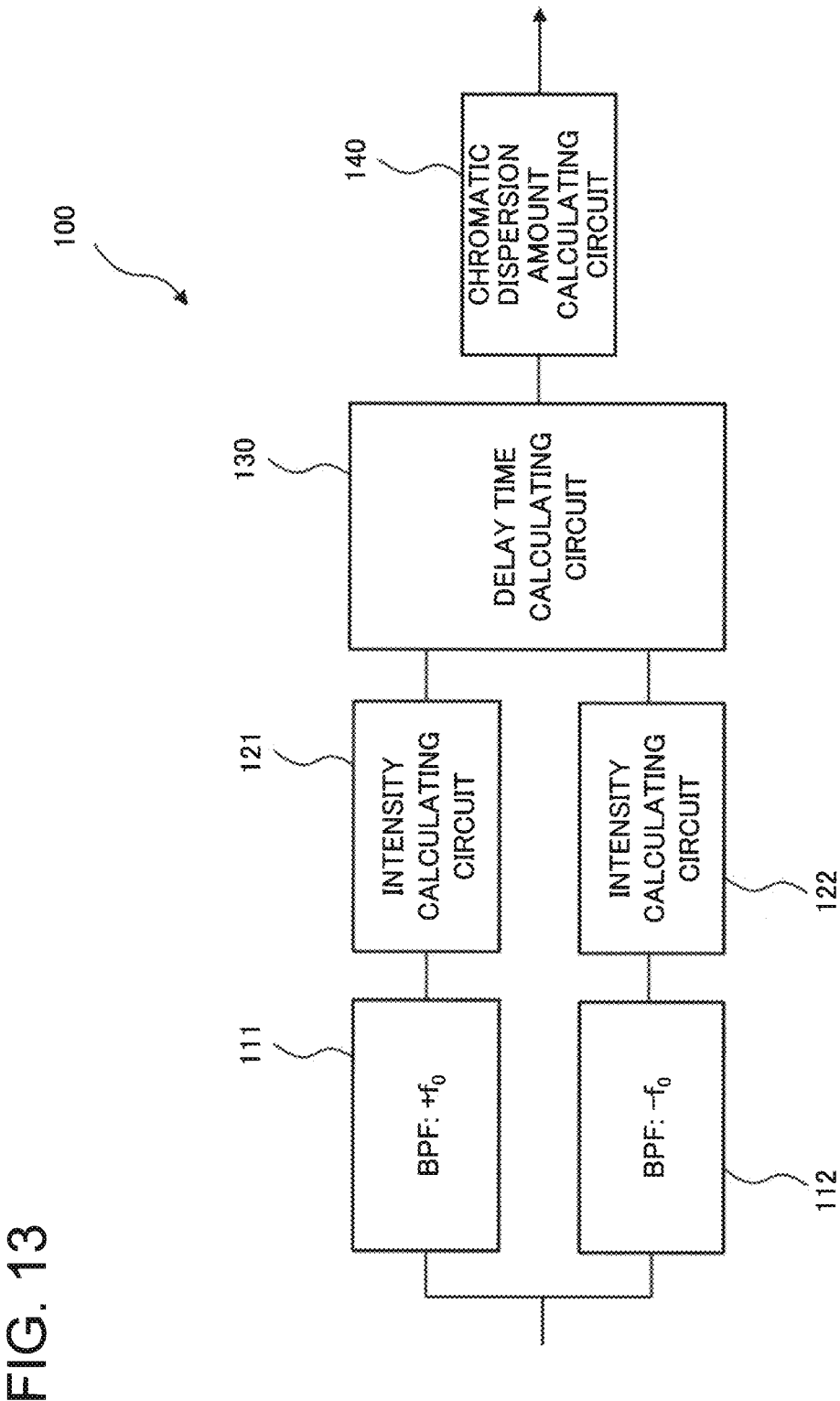
FIG. 13 is a block diagram illustrating a configuration of a chromatic dispersion calculating unit included in the related optical signal receiving apparatus.

As illustrated in FIG. 11, training signals each of which has L symbols at intervals of R symbols are inserted at the same timing in all transmission signals to be sent to cores. Into a transmission signal to be sent to the first core, frequency signals with frequencies $\pm f_1$, $\pm f_2$, and $\pm f_3$ are inserted in this order. Into transmission signals to be sent to the second, fourth, and sixth cores, frequency signals with frequencies $\pm f_3$, $\pm f_1$, and $\pm f_2$ are inserted in this order. Into transmission signals to be sent to the third, fifth, and seventh cores, frequency signals with frequencies $\pm f_2$, $\pm f_3$, and $\pm f_1$ are inserted in this order.

The training signals are inserted into the transmission signals as described above, which enables the transmission signals to include different frequency components at the same timing between adjacent cores using only three types of frequency signals. In addition, it can be configured that a training signal with frequency components of a pair of signals whose frequency difference is maximized (a frequency signal with frequency $+f_1$, for example) appears at a constant frequency in the training signals periodically inserted into each optical signal.

As mentioned above, according to the optical transmission system of the present example embodiment, it is possible, in the optical transmission system to transmit optical signals using a plurality of adjacent paths, to detect a delay difference between a plurality of paths and chromatic dispersion with a high degree of accuracy even though a crosstalk arises.

The present invention has been described above using the above-mentioned example embodiments as exemplary examples. However, the present invention is not limited to the above-mentioned example embodiments. That is to say, various aspects that can be understood by those skilled in the art can be applied within the scope of the present invention.

This application is based upon and claims the benefit of priority from Japanese patent application No. 2015-062670, filed on Mar. 25, 2015, the disclosure of which is incorporated herein in its entirety by reference.

REFERENCE SIGNS LIST

1000 Optical transmission system
1100 Optical transmitter
1110 Data signal input unit
1120 Coding unit
1131 First training signal insertion unit
1132 Second training signal insertion unit
1141, 1142 Optical modulator
1150 Light source
1200, 2200 Optical receiver
1210 Local light source
1221, 1222 Optical front end unit
1231, 1232 Analog-to-digital converter
1240 Delay difference detecting part
1241, 1251, 2241 Band pass filter (BPF)
1242, 1252 Intensity calculation unit
1243, 1253, 2243 Peak detection unit
1244 Averaging processing unit
1245, 2247 Inter-core delay time calculation unit
1254, 2244 Delay time calculation unit
1250 Chromatic dispersion estimating part
1255, 2245 Chromatic dispersion calculation unit
1261, 1262, 2251, 2252 Waveform distortion compensation unit
1271, 1272, 2261, 2262 Timing adjustment unit
1280, 2270 Decoding unit
1300, 1310 Multicore fiber transmission path
1301 First core
1302 Second core
1311 to 1317 Core
1401, 1402 Fan-out unit
2240 Chromatic-dispersion/delay-difference detecting part
2242 Power calculation unit
2246 Time correction unit
100 Related chromatic dispersion calculation unit
111, 112 Band pass filter
121, 122 Intensity calculation circuit
130 Delay time difference calculation circuit
140 Chromatic dispersion amount calculation circuit

What is claimed is:

1. A method for detecting optical signal information, comprising:
generating a plurality of data signal sequences corresponding to a plurality of paths multiplexed spatially, each of the plurality of data signal sequences obtained by inserting periodically a training signal of a plurality of training signals with a plurality of frequency components in a data signal,
in the plurality of data signal sequences,
the training signals respectively included in the data signal sequences to be propagated through adjacent paths at least having different frequency components from each other at a same timing,
each of a plurality of the training signals included in one of the data signal sequences having the plurality of frequency components having a frequency difference differs depending on a position to be inserted; and
calculating a propagation delay difference between the plurality of paths and chromatic dispersion amounts in the plurality of paths from the plurality of frequency components included in the training signals having been propagated through the plurality of paths by optical signals,
wherein the calculating of the propagation delay difference between the plurality of paths includes using detection times of different frequency components included in the training signals at the same timing in the plurality of data signal sequences having been propagated through the plurality of paths by the optical signals, and
the calculating of the chromatic dispersion amounts in the plurality of paths includes obtaining a delay time from a difference in detection time between the plurality of frequency components using the training signal with a maximum frequency difference between the plurality of frequency components.

2. The method for detecting optical signal information according to claim 1, wherein the calculating of the propagation delay differences includes obtaining a difference between a first average detection time and a second average detection time, the first average detection time being an average value of respective detection times of frequency components having a same absolute value and opposite signs, and differing from each other and included in a first training signal constituting a first data signal sequence of the plurality of data signal sequences, and the second average detection time being an average value of respective detection times of frequency components having a same absolute value and opposite signs, and differing from each other and included in a second training signal constituting a second data signal sequence different from the first data signal sequence of the plurality of data signal sequences.

3. The method for detecting optical signal information according to claim 1, wherein the calculating of the propagation delay difference includes obtaining a difference between a first corrected detection time and a second corrected detection time, the first corrected detection time obtained by correcting, using the chromatic dispersion amount in the path through which the first data signal sequence being is propagated, a detection time of a frequency component included in a first training signal constituting a first data signal sequence of the plurality of data signal sequences, and the second corrected detection time obtained by correcting, using the chromatic dispersion amount in the path through which the second data signal sequence being is propagated, a detection time of a frequency component included in a second training signal constituting a second data signal sequence different from the first data signal sequence of the plurality of data signal sequences.

4. An optical transmission system, comprising:

a spatial multiplexing transmission path including a plurality of paths multiplexed spatially;

an optical transmitter configured to send an optical signal to each of the plurality of paths; and an optical receiver configured to receive the optical signal having been propagated through each of the plurality of paths, wherein the optical transmitter is to:

generate a plurality of data signal sequences corresponding to the plurality of paths, each of the plurality of data signal sequences obtained by inserting periodically a training signal of a plurality of training signals with a plurality of frequency components in a data signal, and generate a plurality of the optical signals by modulating optical carriers respectively with the plurality of data signal sequences, wherein, in the plurality of data signal sequences, the training signals respectively included in the data signal sequences to be propagated through adjacent paths at least include different frequency components from each other at a same timing, and each of the plurality of training signals included in one of the data signal sequences includes the plurality of frequency components having a frequency difference differs depending on a position to be inserted, wherein the optical receiver is to:

receive and detect the plurality of optical signals having been propagated through the plurality of paths respectively, and output the plurality of data signal sequences, and calculate a propagation delay difference between the plurality of paths and chromatic dispersion amounts in the plurality of paths from the plurality of frequency components included in the training signals constituting the data signal sequences output from the optical detection section, wherein a propagation delay difference between the plurality of paths is calculated from detection times of different frequency components included in the training signals at a same timing in the plurality of data signal sequences output, and chromatic dispersion amounts in the plurality of paths are respectively calculated by obtaining a delay time from a difference in detection time between the plurality of frequency components using the training signal with a maximum frequency difference between the plurality of frequency components included in the data signal sequences output.

5. The optical transmission system according to claim 4, wherein the propagation delay difference is calculated by obtaining a difference between a first average detection time and a second average detection time, the first average detection time is an average value of respective detection times of frequency components that have a same absolute value and opposite signs, and that differ from each other and are included in a first training signal constituting a first data signal sequence of the plurality of data signal sequences, and the second average detection time is an average value of respective detection times of frequency components that have a same absolute value and opposite signs, and that differ from each other and are included in a second training signal constituting a second data signal sequence different from the first data signal sequence of the plurality of data signal sequences.

6. The optical transmission system according to claim 4, the propagation delay difference is calculated by obtaining a difference between a first corrected detection time and a second corrected detection time, the first corrected detection time is obtained by correcting, using the chromatic dispersion amount in the path through which the first data signal sequence is propagated, a detection time of a frequency component included in a first training signal constituting a first data signal sequence of the plurality of data signal sequences, and the second corrected detection time is obtained by correcting, using the chromatic dispersion amount in the path through which the second data signal sequence is propagated, a detection time of a frequency component included in a second training signal constituting a second data signal sequence that is different from the first data signal sequence of the plurality of data signal sequences.

7. An optical receiver, comprising:

an optical detector implemented in hardware and configured to receive and detect a plurality of optical signals having been respectively propagated through a plurality of paths multiplexed spatially, and output a plurality of data signal sequences; and a processor calculate a propagation delay difference between the plurality of paths and chromatic dispersion amounts in the plurality of paths, wherein the data signal sequence is obtained by inserting periodically a training signal of a plurality of training signals with a plurality of frequency components in a data signal, wherein, in a plurality of the data signal sequences corresponding to the plurality of paths, the training signals respectively included in the data signal sequences to be propagated through adjacent paths at least include different frequency components from each other at a same timing, and each of the plurality of training signals included in one of the data signal sequences includes the plurality of frequency components having a frequency difference differs depending on a position to be inserted, wherein the propagation delay difference and the chromatic dispersion amounts are calculated from the plurality of frequency components included in the training signals constituting the data signal sequences output from, wherein a propagation delay difference is calculated between the plurality of paths from detection times of different frequency components included in the training signals at a same timing in the plurality of data signal sequences output, and chromatic dispersion amounts in the plurality of paths are respectively calculated by obtaining a delay time from a difference in detection time between the plurality of frequency components using the training signal with a maximum frequency difference between the plurality of frequency components included in the data signal sequences output.

8. The method for detecting optical signal information according to claim 1, wherein the calculating of the propagation delay differences includes obtaining a difference between a first average detection time and a second average detection time, the first average detection time being an average value of respective detection times of frequency components having a same absolute value and opposite signs, and differing from each other and included in a first training signal constituting a first data signal sequence of the plurality of data signal sequences, and the second average detection time being an average value of respective detection times of frequency components having a same absolute value and opposite signs, and differing from each other and included in a second training signal constituting a second data signal sequence different from the first data signal sequence of the plurality of data signal sequences.

9. The method for detecting optical signal information according to claim 1, wherein the calculating of the propagation delay difference includes obtaining a difference between a first corrected detection time and a second corrected detection time, the first corrected detection time obtained by correcting, using the chromatic dispersion amount in the path through which the first data signal sequence is propagated, a detection time of a frequency component included in a first training signal constituting a first data signal sequence of the plurality of data signal sequences, and the second corrected detection time obtained by correcting, using the chromatic dispersion amount in the path through which the second data signal sequence is propagated, a detection time of a frequency component included in a second training signal constituting a second data signal sequence different from the first data signal sequence of the plurality of data signal sequences.

10. The optical transmission system according to claim 4, wherein the propagation delay difference is calculated by obtaining a difference between a first average detection time and a second average detection time, the first average detection time is an average value of respective detection times of frequency components that have a same absolute value and opposite signs, and that differ from each other and are included in a first training signal constituting a first data signal sequence of the plurality of data signal sequences, and the second average detection time is an average value of respective detection times of frequency components that have a same absolute value and opposite signs, and that differ from each other and are included in a second training signal constituting a second data signal sequence different from the first data signal sequence of the plurality of data signal sequences.

11. The optical transmission system according to claim 4, wherein the propagation delay difference is calculated by obtaining a difference between a first corrected detection time and a second corrected detection time, the first corrected detection time is obtained by correcting, using the chromatic dispersion amount in the path through which the first data signal sequence is propagated, a detection time of a frequency component included in a first training signal constituting a first data signal sequence of the plurality of data signal sequences, and the second corrected detection time is obtained by correcting, using the chromatic dispersion amount in the path through which the second data signal sequence is propagated, a detection time of a frequency component included in a second training signal constituting a second data signal sequence that is different from the first data signal sequence of the plurality of data signal sequences.

* * * * *